UNITED STATES PATENT OFFICE.

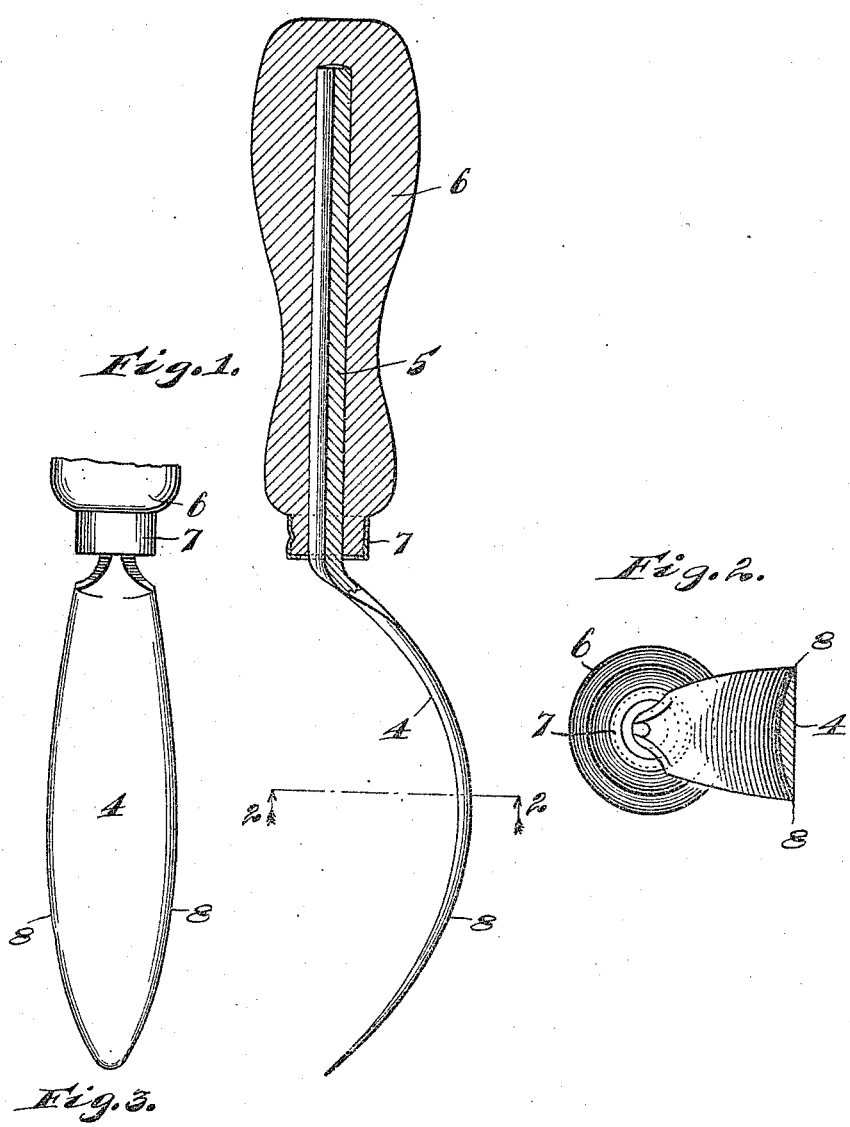

LE ROY BURCH, OF CEDAR RAPIDS, IOWA, ASSIGNOR TO MARY V. BURCH, OF CEDAR RAPIDS, IOWA.

WEEDING-TOOL.

1,294,231.     Specification of Letters Patent.     Patented Feb. 11, 1919.

Application filed September 17, 1917. Serial No. 191,751.

*To all whom it may concern:*

Be it known that I, LE ROY BURCH, a citizen of the United States, and a resident of the city of Cedar Rapids, county of Linn, and State of Iowa, have invented certain new and useful Improvements in Weeding-Tools, of which the following is a specification.

My invention relates to improvements in hand weeding tools and has for its object the production of a device of this character which will be of durable and economical construction, and through the medium of which weeding and the tending or working of growing plants may be effected readily and efficiently.

Other objects will appear hereinafter.

The invention consists in the combinations and arrangements of parts hereinafter described and claimed.

The invention will be best understood by reference to the accompanying drawings, forming a part of this specification, and in which, Figure 1 is a partially sectional side elevation of a tool, embodying the invention, Fig. 2, a section taken on line 2—2 of Fig. 1, and Fig. 3, a front elevation of the lower or forward end portion of the tool.

The preferred form of construction as illustrated in the drawings comprises a broad elongated metallic blade 4, one end of which is curled upon itself to form an integral cylindrical shank 5. Upon the shank 5 is arranged a handle or grip 6, reinforced at its front end by a ferrule 7.

The blade 4 is sharpened at both of its longitudinal or lateral edges 8, and said blade is curved or bowed in the direction of a plane extending perpendicular to the flat sides of the blade. The opposite end of blade 4 is free and converges to a rounding or blunt point having sharpened edges. The outer surface of the blade from side to side is straight and flat so that when said surface is placed against the ground or other surface, the cutting edges of the blade will be adapted to cut close to the ground or surface engaged. This would, of course, not be the case were the outer surface of the blade convex or rounded from side to side.

A tool of the construction set forth is especially applicable in the tending or caretaking of growing plants. It readily adapts itself to eradicating small grass and weeds from thickly set or close growing plants. Because of the curved shape of the blade it will clip away a bit of earth from beside or between plants containing one or more small weeds or spears of grass, and always clearing itself because of its curved shape which allows its free end to come above the ground. Because of the blades being sharpened at both sides or edges it readily lends itself to striking weeds from either side of the row of plants, or from open spaces between plants. Because of the sharp free end of the blade, the latter is adapted to remove grass or weeds from between plants no matter how close together the plants may be. The tool has been thoroughly tested and tried out and found to be especially adapted for employment under the circumstances described.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A device of the class described comprising a broad elongated metallic blade plano-convex in cross section and having its longitudinal edges sharpened, said blade being bowed in the direction of a plane extending perpendicularly to the broad sides of the blade, one end of said blade being provided with a rounded point having a sharpened edge, the opposite end of said blade being straight and curved transversely on itself into a cylindrical shank, the point and shank being in alinement and a handle embracing said shank, substantially as described.

In testimony whereof I have signed my name to this specification in the presence of two subscribing witnesses.

LE ROY BURCH.

Witnesses:
ALBIN BLAKE,
LIBBIE B. ANDERSON.